(12) United States Patent
Urban et al.

(10) Patent No.: US 8,528,034 B2
(45) Date of Patent: Sep. 3, 2013

(54) MULTI-MODE MODEM

(75) Inventors: David Urban, Downingtown, PA (US); Jorge Salinger, Littleton, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 459 days.

(21) Appl. No.: 12/769,267

(22) Filed: Apr. 28, 2010

(65) Prior Publication Data

US 2011/0271313 A1 Nov. 3, 2011

(51) Int. Cl.
*H04N 7/173* (2011.01)
*H04L 12/28* (2006.01)
*H04L 12/56* (2006.01)

(52) U.S. Cl.
USPC ............. 725/111; 725/98; 725/119; 725/121; 370/401

(58) Field of Classification Search
USPC ............. 725/81, 98, 111, 119, 121, 126, 128; 370/401
See application file for complete search history.

(56) References Cited

U.S. PATENT DOCUMENTS

| | | | | | |
|---|---|---|---|---|---|
| 5,446,918 | A | * | 8/1995 | Lamy | 725/114 |
| 5,767,895 | A | * | 6/1998 | Yashiro et al. | 725/117 |
| 6,493,873 | B1 | * | 12/2002 | Williams | 725/98 |
| 7,127,734 | B1 | * | 10/2006 | Amit | 725/80 |
| 7,701,951 | B2 | * | 4/2010 | Chapman et al. | 725/111 |
| 7,954,131 | B2 | * | 5/2011 | Cholas et al. | 725/112 |
| 2001/0030785 | A1 | * | 10/2001 | Pangrac et al. | 359/125 |
| 2002/0012495 | A1 | * | 1/2002 | Sasai et al. | 385/24 |
| 2002/0136231 | A1 | | 9/2002 | Leatherbury et al. | |
| 2004/0068747 | A1 | * | 4/2004 | Robertson et al. | 725/98 |
| 2004/0168199 | A1 | | 8/2004 | Phillips et al. | |
| 2004/0246193 | A1 | * | 12/2004 | Carey | 343/853 |
| 2009/0049492 | A1 | | 2/2009 | Pantelias et al. | |
| 2009/0235316 | A1 | | 9/2009 | Wu et al. | |

OTHER PUBLICATIONS

PCT/US/34160 International Search Report, mail date Jul. 7, 2011.

* cited by examiner

*Primary Examiner* — Pankaj Kumar
*Assistant Examiner* — Randy Flynn
(74) *Attorney, Agent, or Firm* — Banner & Witcoff, Ltd.

(57) ABSTRACT

A modem system may include modems that have multiple upstream transmitters for transmitting signals upstream in a communication network. In some embodiments herein, one or more of those upstream transmitters may be retasked to transmit downstream signals for reception at devices within a modem's premises. The downstream signal may be modulated differently from its original modulation as received by the modem, and may be modulated in a manner that can be received by legacy components on the premises, such as analog televisions.

17 Claims, 4 Drawing Sheets

MULTI-MODE MODEM

FIELD OF ART

The features described herein generally relate to providing users with access to content over a network. More specifically, aspects of the disclosure relate to signal modulation in a modem.

BACKGROUND

Technology continues to advance at a rapid pace, oftentimes leaving in its wake a sea of outdated, or legacy, technological devices that need updating, upgrading, or even replacing. A case in point is in televisions. The United States is currently undergoing a transition from the old analog television signal format established by the National Television Systems Committee (NTSC) in the 1940s and 50s to a new digital signal format established by the Advanced Television Systems Committee (ATSC). With this change, many analog NTSC televisions are becoming outdated.

The same is true for other advances in television technology, such as in advances in video compression and data modulation techniques. For example, digital video may be transmitted according to the Moving Pictures Expert Group's (MPEG) MPEG-2 format. As new and improved formats or modulations are developed (e.g., MPEG-4, DVB-C2 (Digital Video Broadcasting—Cable 2)), devices that were configured to process the older formats become outdated and require replacement or upgrading.

Upgrading and replacing devices can be costly and inconvenient, and there is an ever-present need to provide backwards compatibility for legacy devices in as easy a manner as possible.

SUMMARY

This summary is not intended to identify critical or essential features of the disclosure provided herein, but instead merely summarizes certain features and variations thereof.

In some embodiments, an interactive services gateway may include a plurality of upstream modulators for transmitting signals upstream to a device at another location from the gateway. In response to receiving a request from a device at the gateway's location, the gateway may retask one of the upstream modulators to operate in a downstream mode and transmit requested content using an on-premise communication network. So, for example, a DOCSIS (Data Over Cable Service Interface Specification by Cablelabs) cable modem might include four QAM upstream transmitters that normally transmit signals upstream to a DOCSIS CMTS (cable modem termination system), but the gateway herein, if operating in such a system, may retask one of those transmitters to transmit in the downstream direction instead using a channel and/or modulation that legacy televisions may receive, such as an NTSC UHF (Ultra-High Frequency) or VHF (Very-High Frequency) channel.

The gateway may change the content format and/or the modulation type when transmitting the requested content on the on-premise communication network, thereby allowing devices to receive content that may have originally been received in a format or modulation that is incompatible with the device itself. In some embodiments, the gateway can insert the downstream transmission into a passthrough downstream frequency range, replacing an original channel with a locally-generated one containing the requested content.

In some embodiments, switched filtering may be used to control the filtering of signals at the gateway, and to remove certain filtering when the upstream transmitter is retasked.

In some embodiments, the gateway may receive commands from wireless devices that lack a line-of-sight. For example, a whitespace RF receiver may receive wireless control commands from a remote control.

In some embodiments, the gateway may store configuration or preference information for the various pieces of customer premise equipment served by the gateway, including for one-way devices such as a receive-only television.

Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
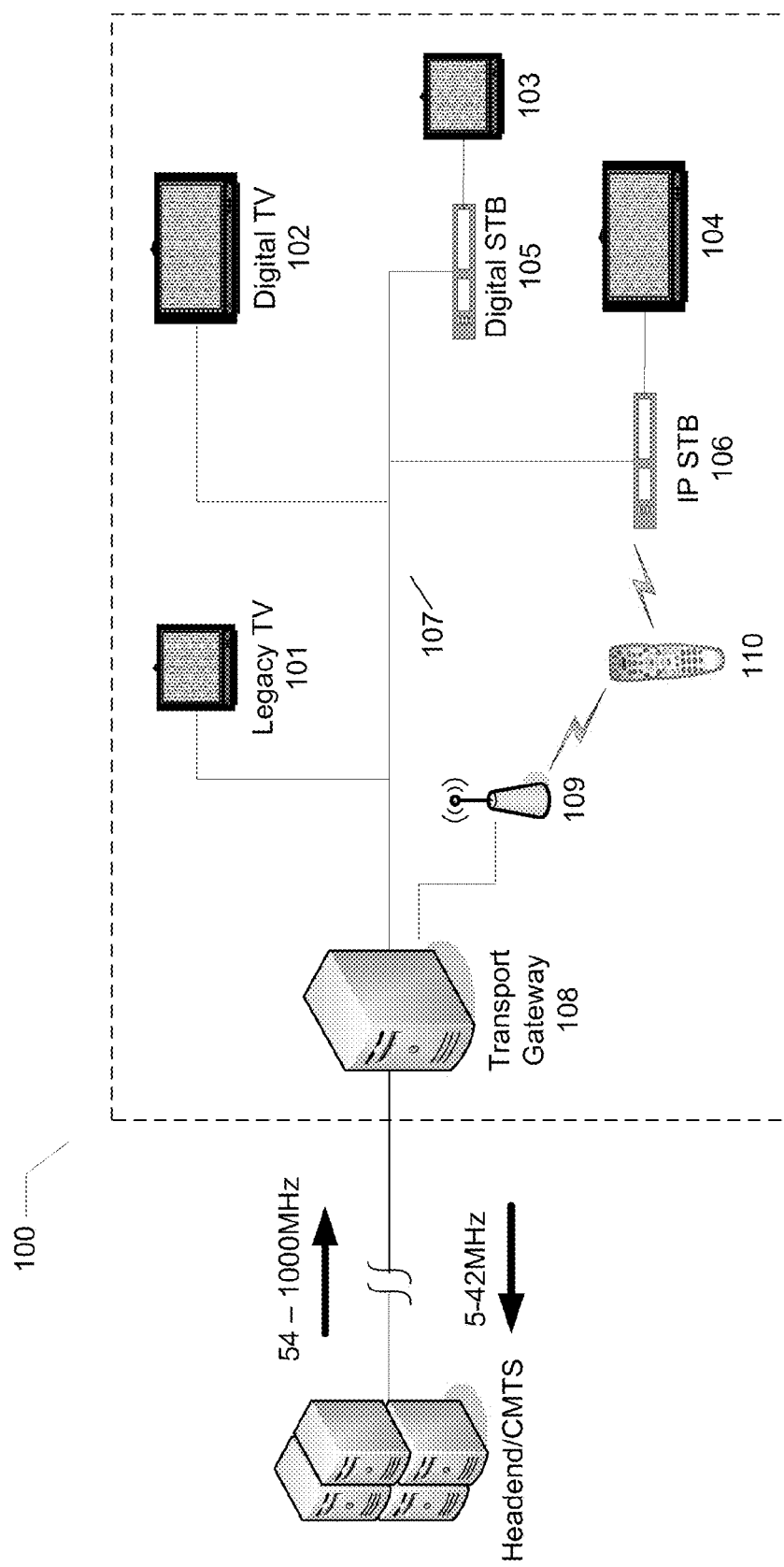
FIG. 1 illustrates an example household having various electronic devices, and a transport gateway to support those devices.

FIG. 1 illustrates an example premises, or household 100. In the household, there may be a plurality of customer premises equipment (CPE), such as televisions 101-104 and set-top boxes (STBs) 105-106, that a user might use to view, listen to, or otherwise consume electronic information content (e.g., television shows, movies, songs, Internet content, etc.) received from outside the home.

Beginning with the televisions 101-104, they may be any type of audio/video receiving device. For example, there may be one or more legacy televisions 101, such as a traditional analog NTSC television. There may be one or more newer, digital televisions 102. Digital televisions 102 may include internal circuitry and processing to handle the newer digital transmission format of the ATSC. Other televisions 103 and 104 are also illustrated, in the context of their respective set-top boxes (STBs) 105 and 106. Alternatively, devices 101-104 may simply be computer display monitors, or other display devices such as wireless handheld devices, configured to receive digital content for display to a user.

The set-top boxes 105 and 106 may be any desired type of signal reception device, which can supply a content signal (e.g., video) for a user's consumption. For example, a set-top box 105 may be a digital set-top box. The digital set-top box 105 may include circuitry and processing to tune and decode digital video signals used by the local cable company to transmit content to the home. Those digital signals may be ATSC digital television signals, or any other desired transport mechanism or protocol. The set-top box 105 may receive a user's request to tune to a particular television program, and may respond by tuning to the correct signal from a content provider and processing it for display on the user's television set 103.

Other types of set-top box may be used as well. For example, a set-top box 106 can be an Internet Protocol set-top box (IP STB). An IP STB 106 may be similar to the digital STB 105, although the IP STB 106 may tune to and receive a digital IP transport stream, such as an MPEG transport stream, and process it for display on the user's television 104. Set-top boxes are used in examples herein, but any desired computing device can be used, such as digital video recorders (DVRs), personal computers, cell phones, mobile devices, etc. Devices 105 and/or 106 may be another device that performs functions of a set-top box, and which may be located, for example, at a gateway 108.

These various pieces of CPE may be connected to an in-home communication network 107. The network 107 may be any desired type of network that allows the various devices in the home to communicate with other devices, either in the home or external to the home. For example, network 107 may be the in-home wired coaxial cable network that exists in many homes today. Such an in-home network may communicate in accordance with the Multimedia Over Coax Alliance (MoCA) standard, which uses the home's existing coaxial network to carry data between devices in the home. Other types of networks may be local wireless, telephone twisted pair wiring, fiber, Ethernet, etc., or a combination of the above.

Figure 3:
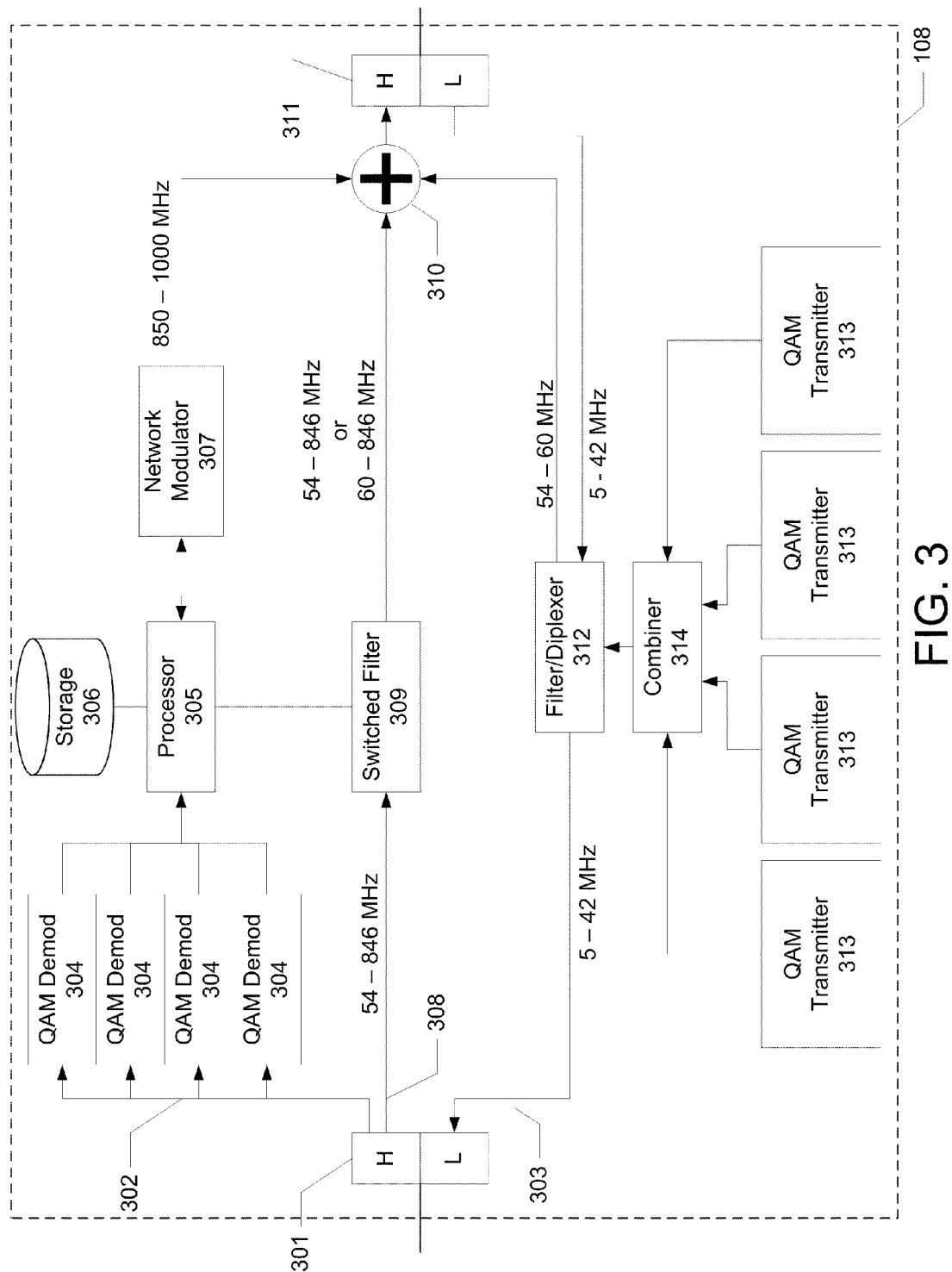
FIG. 3 illustrates a portion of an example transport gateway, such as the one shown in FIG. 1.

The network 107 may allow the various devices to communicate with (or receive data from) a transport gateway 108. The gateway 108 may be an interface device that allows CPEs in the home to communicate with devices outside of the home. The gateway 108 may have modulation and demodulation circuitry for communicating on the network 107 and on an external network. The actual network may be a wireless, fiber optic, coaxial cable, twisted-pair telephone, or another type of network. One example is a hybrid fiber/coax cable (HFC) distribution network, and with a head-end component such as a DOCSIS CMTS. Example components of the gateway 108 are illustrated in FIG. 3.

The gateway 108 may be connected to, or may include, one or more wireless communication transceivers 109. The transceivers 109 may be configured to communicate wirelessly with other devices within the home, such as with a wireless remote control 110. The transceiver 109 may be a white space radio frequency (RF) transceiver configured to detect unused RF channels in the home's vicinity and use those channels for local wireless communications. These unused channels may be UHF, VHF, infrared, or any other desired portion of the electromagnetic spectrum to allow wireless communications.

Figure 2A:
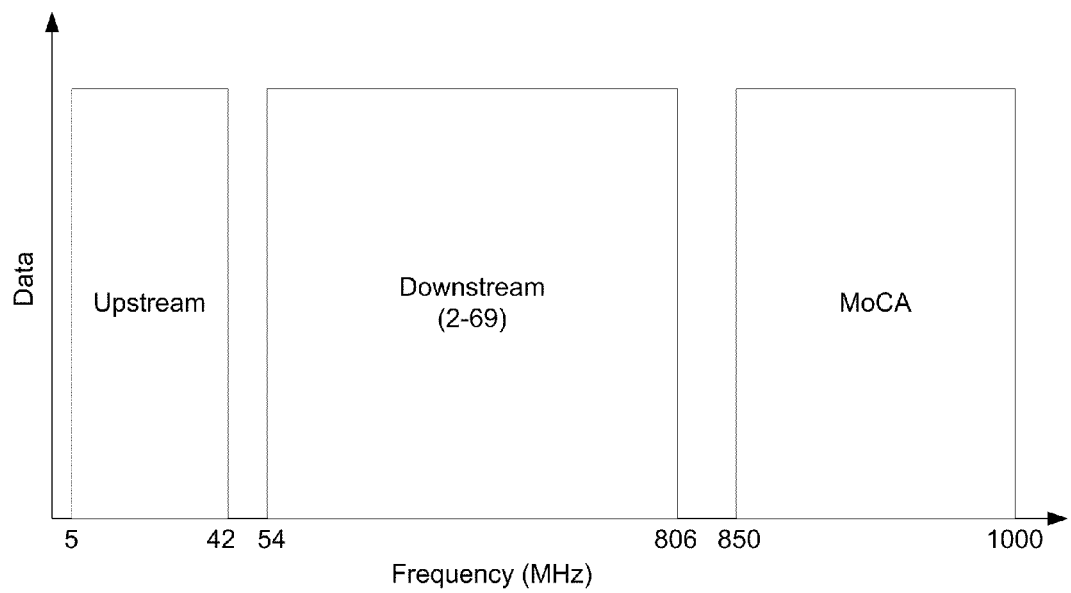
FIGS. 2a & 2b illustrate example frequency maps that may be used by the devices shown in FIG. 1.

FIG. 2a illustrates an example frequency distribution that may occur if the network 107 and the external network share a common communication medium, such as an optical fiber or coaxial cable. In the illustrated example, a portion (e.g., 5-42 MHz) of the frequency spectrum on that medium may be used for upstream communications originating from a home's transmission device, such as a modem (e.g. a modem in the gateway 108 or CPE 105/106) and directed to a termination system, such as a CMTS. For upstream communication, a number of transmission channels may be defined to carry the upstream data. For example, under DOCSIS, up to four upstream channels can be defined. The channels may be placed at locations in the spectrum that offer the best clarity (which can vary from headend to headend, for example), and can have different bandwidths and modulations, depending on the signal characteristics of the particular provider's system. For example, upstream channels may occupy 200 kHz, 3.2 MHz or 6.4 MHz of the spectrum, and can use various types of modulation (e.g., QPSK, 16-QAM, 32-QAM, 64-QAM, and 128-QAM) to carry data on the upstream channel.

Another portion of the spectrum (e.g., 54-806 MHz) may be used for downstream communications from the MTS to the home's modem. Similar to the upstream portion, the downstream portion may also include a number of distinct channels used to transmit downstream information. The frequency range may overlap with the original 6 MHz channels 2-69 specified by the NTSC, so the downstream channels may conveniently be defined to correspond to those NTSC channels. The downstream channels may use the same modulation rates as in the upstream channels, although the downstream channels may often use the higher modulation rates (e.g., 32-QAM, 64-QAM and 128-QAM) because downstream signal quality is often better than upstream.

A third portion of the spectrum (e.g., 850-1000 MHz) may be used for communications within the home. For example, the MoCA standard defines various channels and modulations for use in this typically higher-end frequency range. Devices within the home can communicate on those frequencies without disturbing the upstream/downstream MTS traffic being carried on the 5-42 MHz upstream and 54-806 MHz downstream.

As noted above, the downstream channels may be used by the provider to transmit data using a variety of types of modulation, and new modulation techniques may help increase the effectiveness of this communication. For example, newer modulation techniques used by MPEG-4 or DVB-C2 may carry data more efficiently on the channels. However, older, legacy devices might not have the advanced demodulators needed to tune to those advanced downstream channels, and may need upgrading or replacement.

In some embodiments, those legacy devices may continue to use their existing hardware to receive the newer content. The gateway 108 may be updated to receive the new format or modulation, and may use its updated equipment to receive the new form of content. Also, the gateway 108 can use the older modulation/form to transmit the content to the CPEs in the home, thereby allowing the older legacy devices to continue to use their old equipment to receive the new form of content.

Figure 2B:
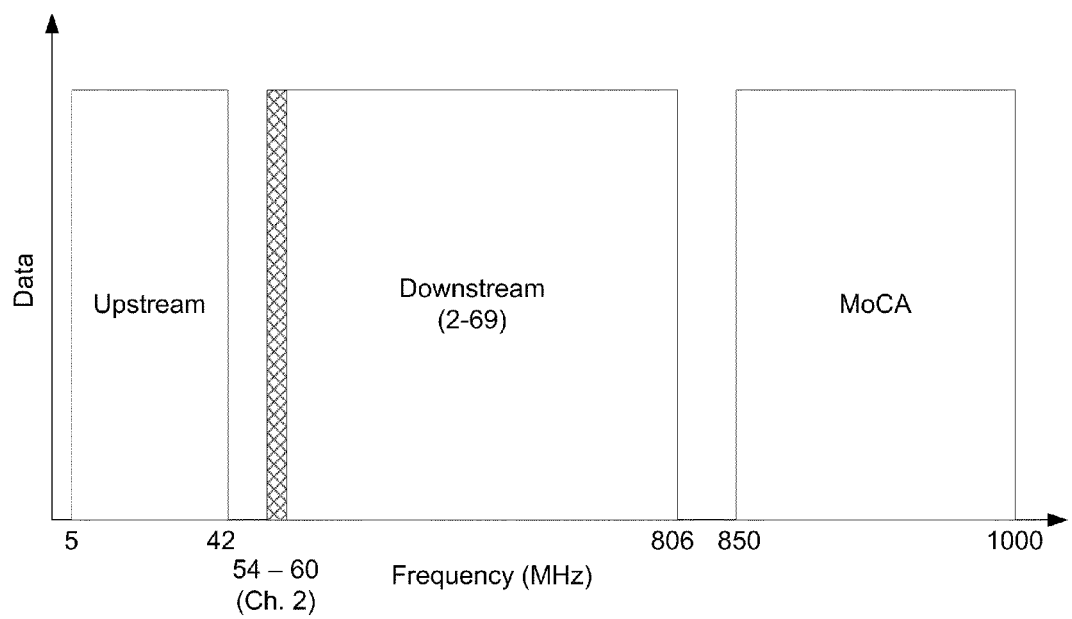

For transmission within the home, a portion of the downstream channels may be retasked for use in the in-home network 107. As illustrated in FIG. 2b, the frequency range that was NTSC channel 2 (i.e., 54-60 MHz) may be reallocated for use by the gateway 108 to transmit signals using a different modulation or format from what was received by the gateway 108 on that channel. In other words, the gateway 108 may receive an MPEG-4 or DVB-C2 data stream on channel 2, but the channel 2 supplied from the gateway 108 on to network 107 may be modulated according to the original NTSC channel 2 modulation. In this manner, an older legacy television 101 may simply tune to its channel 2, and be able to display content that may have been in a different format or modulation when it was received on that channel by gateway 108. Although NTSC channel 2 is illustrated as the example, other modulations/channels may be used as well, depending on the target device (e.g., UHF, VHF channels).

The gateway 108 may include a modulator for that functionality. However, in some embodiments, this modulator may be a dual-mode one that can be used for both upstream communications in the allocated upstream bandwidth region (e.g., 5-42 MHz) and in the local retasked region (e.g., 54-60 MHz). FIG. 3 illustrates an example gateway device 108, which may include such a dual-mode modulator.

In FIG. 3, the gateway 108 may include an input/output connection (on the left) that is fed to a high/low pass filter 301. The filter 301 may generally filter out signals to help reduce noise on the line. For example, downstream signals, which may arrive in the 54-806 MHz and 850-1000 MHz portions of the spectrum, may be forwarded on the upper path 302 from filter 301 using a high-pass output portion that filters out low-end frequency signals that are not part of the downstream band.

Similarly, the filter 301 may include a low-pass input portion 303, so that outgoing upstream signals (e.g., 5-42 MHz) originating from the gateway 108 (or from one of the home's CPEs and STBs) may be received and transmitted back out to the external network and MTS with the upper frequency portions (e.g., above 42 MHz) filtered out.

In the upper portion 302, the downstream channels may be supplied to demodulators 304. These channels may be carried on simple split lines from the high-pass portion, supplying each modulator 304 with a copy of the downstream channel spectrum. Alternatively, the filter 301 high-pass portion may include additional filters to supply a specific frequency range to each of the demodulators 304. For example, the demodulators 304 may each be configured to tune to a specific downstream channel (e.g., channel 10, channel 12, etc.), so the filter 301 may be configured (e.g., through circuitry, programming, etc.) to supply just that channel to the corresponding demodulator 304.

Four demodulators are shown in FIG. 3, but any number of desired demodulators may be used. Also, the demodulators 304 are illustrated as quadrature amplitude modulation demodulators (QAM Demods), but any desired type of demodulator may be used.

The outputs of the demodulators 304 may be provided to a processor 305. Generally, the processor 305 may be a computer processor that is configured to execute computer-executable software instructions stored on a computer-readable medium, such as storage 306. Storage 306 may be any desired type of storage, such as flash, random access memory (RAM), read-only memory (ROM), removable media (e.g., floppy disk, compact optical disk, thumb drive, etc.). Under the control of those instructions, the processor 305 may cause the gateway 108 and associated devices to perform any of the functions described herein.

One such function may be the offering of content on the internal network 107. To this end, the processor 305 may supply (or cause to be supplied) signals obtained from one or more demodulators 304 to a network modulator, such as MoCA modulator 307. The network modulator 307 may modulate the desired signals onto a channel that can be received by various MoCA compatible devices (e.g., clients, customer premises equipment—CPE, etc.), such as IP STB 106 or directly to a viewing device. Multiple MoCA channels may be modulated to be received by multiple distinct MoCA devices (e.g., four MoCA channels may supply distinct signals to four different CPEs).

As illustrated in the FIG. 1 example, the household may also include devices, such as digital STB 105 or digital viewing device, that may be configured to receive and handle the entire downstream channel spectrum. To supply that spectrum to those devices, the gateway 108 may include a bypass downstream signal path 308. The bypass downstream signal path 308 may carry a duplicate of path 302, so that the original downstream signal can be made available on the network 107 for devices in the home that need it.

This original downstream signal may, however, first pass through a switched filter 309. The switched filter 309 may be used to cause a portion of the downstream signal to be filtered out, so that that portion can be replaced with another channel. The operation of this will be discussed further below with respect to FIG. 4.

The output of the switched filter 309 and the output of the in-home network modulator 307 may be summed at a signal combiner 310, and the combined signal may be supplied to another filter 311. The filter 311 may include a high-pass portion to filter out low-end portions of the spectrum (e.g., low frequency noise introduced in the gateway 108), allowing the downstream channel and modulated in-home signals, such as MoCA signals, to pass out to the network 107 for reception by the CPEs and STBs.

The gateway 108 may also be used to handle upstream signals. For example, the gateway 108 may include an upstream cable modem transmitter portion with four QAM transmitters 313, and with a filter/diplexer 312 and combiner 314 to facilitate this communication. The four transmitters 313 may initially be used, for example, to transmit four upstream DOCSIS channels to the MTS. The filter/diplexer 312 may serve two primary purposes. The first such purpose is the addition of upstream signals to the other upstream signals emanating from CPEs in the home.

For that first function, the gateway 108 may itself include one or more modulators or transmitters 313. The modulators 313 may be configured to modulate signals in the upstream band. For example, the modulators 313 may be QAM transmitters configured to transmit four different upstream DOCSIS channels, using the designated upstream bandwidth, or other type of modulators. The signals from the modulators 313 may be combined at a combiner 314, and then sent on the filter/diplexer 312, at which point it is combined with the other upstream signals from the CPEs in the home (received via the low-pass portion of filter 311). That total upstream signal may then be supplied as the low-pass input portion 303 to the filter 301, which may then propagate the upstream lower band out to the network and components such as the termination system.

The filter/diplexer's 312 second primary purpose may be to allow one or more of the upstream QAM modulators 313 to be retasked from sending upstream signals to supplying downstream channel signals to an in-home device, such as a viewing device, an STB or other CPE. This may involve changing the modulator's operation so that signals are modulated differently. One difference may be placing the modulated signal on a different channel—one designated for downstream propagation instead of upstream propagation. For example, a transmitter 313 may be retasked to transmit a standard NTSC signal using the channel 2 frequency (e.g., 54-60 MHz) back to the summing circuit 310, and on to the home network 107.

Figure 4:
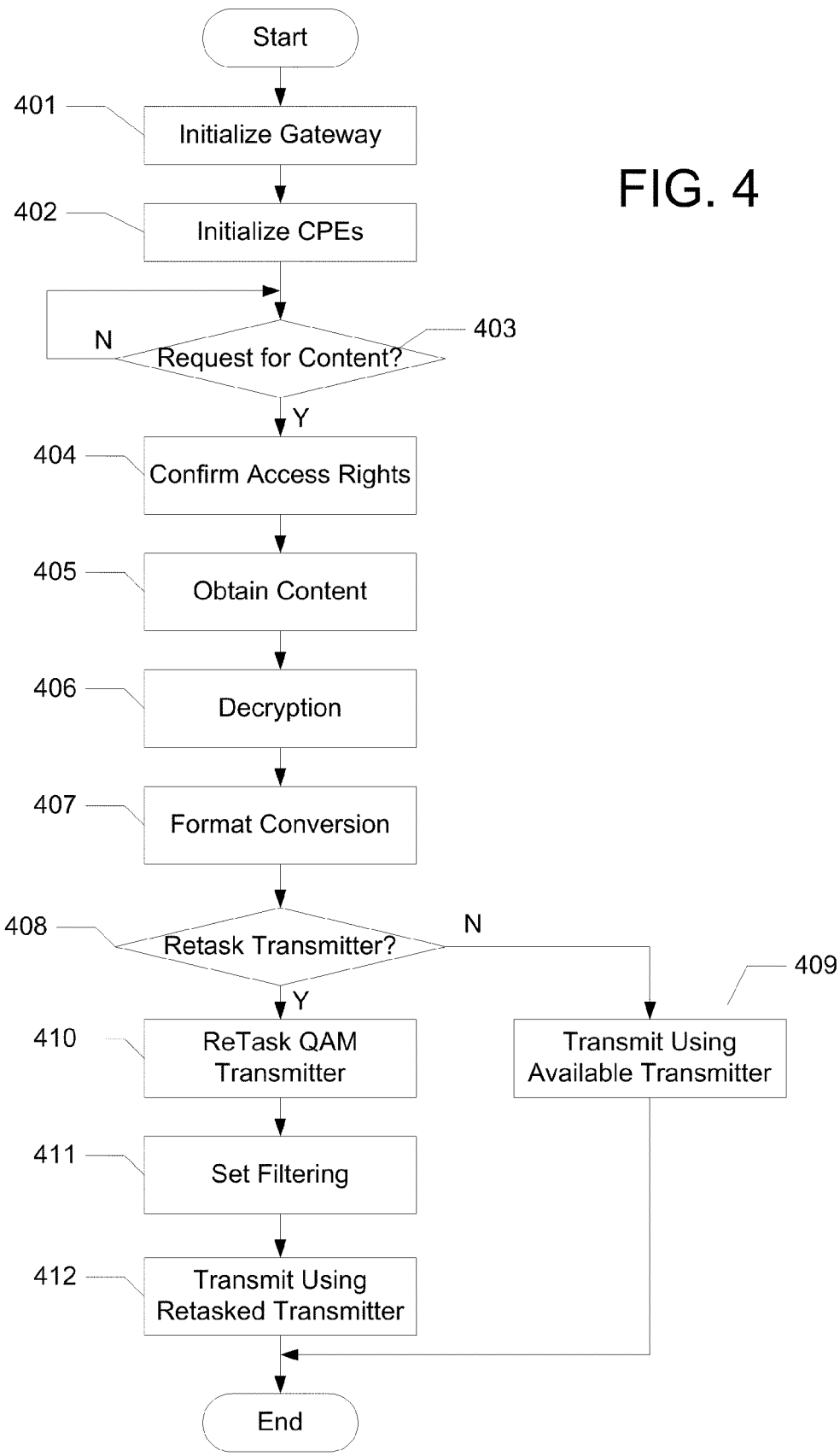
FIG. 4 illustrates an example process flow, involving the transport gateway shown in FIG. 3.

FIG. 4 illustrates an example process for implementing aspects of the disclosure. Initially, in step 401, the gateway 108 may be initialized for operation. This initialization may involve, for example, the gateway 108 being installed at the home, and initial communication with an MTS according to a particular protocol, such as DOCSIS. The initialization may also include initializing local in-home network communications as well, such as initializing MoCA communications with various MoCA clients in the home, or individual CPE devices, etc.

In step 402, the various CPEs in the home may also be initialized. This initialization may be similar to the initialization of the gateway 108, but from the perspective of the end device, such as a set-top box, modem such as a cable modem, television, etc. The initialization may include discovery communications, to inform the gateway 108 about the specific preferences and/or capabilities of the CPE, and to inform the CPE about the options available from the gateway 108. For example, the IP STB 106 may be connected to the network 107, establish a MoCA connection with the gateway 108, and then transmit information to the gateway identifying itself (e.g., a Media Access Control—MAC—address), identifying its software and hardware capabilities (e.g., operating system version, hardware components installed, audio/video coding/ decoding capability, etc.), and profile preference information (e.g., a subscriber identity or login, the user's list of subscribed services, etc.).

Many CPEs, such as the IP STB 106, are two-way devices that can inform the gateway 108 of the preferences discussed above. However, one-way devices may also be initialized. For example, legacy TV 101 and digital TV 102 might simply be one-way devices that do not transmit signals back to the gateway 108. To initialize those devices, the user may connect them to the network 107, and then directly interact with the gateway 108 to complete the initialization. In this direct interaction, which may be accomplished using a personal computer coupled to the gateway 108, or via a user input/output interface on the gateway 108 itself, for example, the user may access a gateway 108 user interface, and input information identifying the CPE being initialized. Through such an interface, the user may be prompted to inform the gateway 108 of the CPE itself (e.g., legacy TV 101), and may enter preference information.

The preference information requested and entered may include, for example, an identification of how the user intends to have the gateway 108 interact with the legacy TV 101. The information may indicate a downstream mechanism for supplying the legacy TV 101 with content. For example, the information may indicate that a standard definition video signal on NTSC channel 2 (e.g., 54-60 MHz), and on the network 107, is the desired mechanism for conveying information from the gateway 108 to the legacy TV 101.

Additionally, the preference information may identify how the user intends to interact with the legacy TV 101 and the gateway 108 to control what is displayed on the TV 101. For example, the user may indicate that they wish to control the TV 101 using a local handheld remote control 110, and may identify the remote using any desired unique identifier (e.g., another MAC address). The remote control 110 may be a wireless control, and may communicate with an RF whitespace device 109 using any desired clear RF channel. Other user input mechanisms may be chosen as well. For example, the user could specify that commands are to arrive from an external server over the Internet, and the user may use an Internet-enabled phone to transmit commands to that external server, which may in turn transmit commands addressed to the gateway 108.

The gateway 108 may then store information identifying how the legacy TV 101 is to be used. It may note that downstream signals intended for the TV 101 are to be modulated onto NTSC channel 2 on the home's network 107, and that commands to control what the gateway 108 puts on that channel are to arrive from remote control 110 via wireless white space device 109. The same CPE initialization may be conducted for all of the home's devices, and the resulting information may be stored by the gateway 108. An example of stored information may resemble the following:

| CPE Device | Downstream Mechanism | Control Mechanism |
| --- | --- | --- |
| Legacy TV 101 | SD audio/video on NTSC Channel 2 | Remote 110 via RF 109 |
| Digital TV 102 | HD video/5.1 audio on ATSC Channel 3 | Internet Server |
| IP STB 106 | MPEG-4 IP Stream on MoCA Logical Channel A; coding type, encryption type | Return MoCA Signal Path B |
| Digital STB 105 | Passthrough (modified by replaced channels) | Passthrough |

This example table lists "Passthrough" as an option. The passthrough signal may simply pass the originally received downstream signal through the gateway 108 and back out to the home network 107, with some modification and filtering as discussed herein. The receiving device, such as a digital STB 105, might receive this passthrough signal to directly receive and process signals from the provider. This passthrough signal, however, may have one or more channels altered by the switched filter 309, so that those channels can be used to carry signals from the gateway 108 to support, for example, legacy TV 101.

In step 403, the gateway may await receipt of a user request to access content. The content can be any desired piece of information. For example, content may be a video on demand offering, a television program or service, a display of electronic program guide (EPG) information listing available programs, Internet information, etc.

The request can arrive in a variety of ways, depending on the requesting device. For example, the viewing device or IP STB 106 may receive (e.g., from the device's own user interface or remote control) a user request for the content, and may forward that request to the gateway 108 through the local network 107. The request can be forwarded in the home to the gateway 10 using a MoCA return path channel as noted in the example preference profile table above. The request may identify the requested content (e.g., a program identifier, a channel identifier, etc.), parameters for the content (e.g., picture resolution, start time within content, coding type, etc.), the requesting user, and/or the requesting device.

Alternatively, the request can be received at the RF whitespace device 109 from a local RF device, such as remote control 110. As a further alternative, the request can arrive from any other wireless or wired source, such as an IEEE 802.11 wireless device, Bluetooth device, infrared device, etc.

When a request is received, the gateway 108 may determine how to respond to the request in step 404. The gateway 108 may determine whether the requested content is available, and whether the particular user and/or requesting device has the right to access the requested content. For example, if the request is for tuning to a particular channel, the gateway 108 may determine whether the requesting user or device has actually subscribed to a tier of service that permits viewing of the requested channel. This determination may involve further communications by the gateway 108, such as an inquiry to the provider (e.g., to its server), or to a digital rights management (DRM) server, for example.

As another example, content may be restricted by age/parental control, or may require payment (e.g., a pay-per-view movie), and the gateway 108 may take steps to process that payment and/or determine if the identified user exceeds the age restriction on the requested content. Any other access restriction method may be applied here as well (e.g., time of day restrictions, limits on number of views permitted, etc.).

If the access is denied, then the gateway 108 can display a message (on the appropriate downstream channel) informing the user of the denial. If it is granted, then the process may proceed to step 405 to obtain the requested content. In step 405, the gateway 108 may cause one of its demodulators 304 to tune to the downstream channel that is carrying the requested content. The gateway 108 may also issue a request to a server further upstream, such as at the headend or central processing location or server of the provider, and may tune its demodulator to whichever downstream channel that provider will use to supply the requested content to the gateway 108. If the requested content happens to already be available at the gateway 108, such as in storage 306, then this step may be replaced by simply retrieving the content locally from that storage 306.

In step 406, the content may undergo security processing, such as decryption. Certain content (e.g., pay-per view movies, subscription tier cable channels, etc.) may be encrypted by their source to prevent unauthorized access, and that content may be decrypted in step 406.

In step 407, the gateway 108 may perform any desired format conversion on the content. The format conversion may allow the gateway 108 to reformat the requested content to a format more suitable or preferred for the requesting device or user. For example, the CPE initialization 402 may have resulted in an indication that legacy TV 101 has a very small screen. If the requested content is a movie received at the gateway 108 in an HD, widescreen format, the gateway 108 may undertake processing to convert the format to a different format, such as a "pan and scan" zoomed-in version of the movie. Similarly, if 7 audio channels are received, but the requesting device only has 2 speakers, the gateway 108 can reformat the content to remove the unnecessary audio channels, potentially conserving bandwidth on the in-home network 107. As another example, if the video codec at the requesting device can only handle certain types of coded content, then the gateway 108 can perform a coding format conversion to supply the requesting device with a version it can handle.

In step 408, the gateway 108 may determine how it will deliver the content to the requesting device, and whether an existing modulator or transmitter needs to be retasked to handle the delivery. As noted above, the gateway 108 may already have stored profile information identifying how downstream data is to be delivered to each CPE device, so this determination may involve accessing that stored information to determine the content format and/or modulation requirements and capabilities of the target device that will be consuming the content (e.g., the requesting device). This initial determination may already have been performed in order to determine the suitable format conversion (if any) to perform in step 407.

The gateway 108 can then determine whether it has a transmitter that is available to transmit the desired signal to the target requesting device. If a transmitter is available, then the gateway 108 may simply begin the transmission in step 409 using that transmitter, and modulating the signal in accordance with the target device's previously-identified preferences.

If a transmitter is unavailable, then the gateway may proceed to step 410 and retask an upstream transmitter 313 for downstream transmission. There, the gateway processor 305 may instruct one of the transmitters 313 to switch from upstream operation to downstream operation. This may involve supplying or streaming the content to the transmitter, and informing the transmitter 313 of the modulation type to use (e.g., NTSC, ATSC, QAM symbols, etc.) and channel frequency for the transmission.

In response to the retasking, the upstream transmitter may switch to downstream operation, and may begin to transmit on the desired downstream frequency and using the desired modulation, to deliver the content to the target requesting device.

Retasking the transmitter may also involve a step 411 of switching filtering that may be applied to signals at the gateway 108. For example, in normal operation, the upstream transmitter 313 may be expected to transmit only in the designated upstream frequency range (e.g., 5-42 MHz), and signals emanating from the transmitter but outside of that range may be filtered to ensure that they do not propagate outside of the gateway 108 and interfere with other signals. If the transmitter switches modes and switches frequencies, then the filtering may need to be adjusted.

The adjustment may involve setting the filter/diplexer 312 to allow one or more predefined downstream channels to pass from the retasked upstream transmitter 313 back into the home network 107. The downstream channel emanating from the retasked upstream transmitter 313 may be switched to be added to the summing circuit 310 for inclusion in the normal downstream band.

The switched filter 309 may also be switched to filter out, or blank out, the portions of the frequency spectrum that will be occupied by the downstream channel emanating from the retasked upstream transmitter 313. For example, if the gateway 108's profile information indicates that the target requesting device requires an NTSC signal on channel 2, then the gateway 108 may set switched filter 309 to remove channel 2 signals from the downstream signal supplied to the summing circuit 310. In the FIG. 3 example, this may result in the filter 309 removing channel 2 (e.g., 54-60 MHz), so that the resulting downstream signal is the 60-846 MHz range, instead of the original 54-846 MHz range. At the summing circuit 310, that missing range (54-60 MHz) may be added back in by the signal from the retasked transmitter.

From there, the gateway 108 may deliver 412 the content using the retasked transmitter and at the prescribed channel/modulation, and when the content is over, the transmitter may be set back to its original upstream operation. In the interim period, while the transmitter is retasked, the gateway 108 may operate upstream transmissions using just the remaining three AM transmitters 313.

As noted above, FIG. 3 illustrates the gateway 108 having a processor 305 and storage 306, and that these components may be used to execute software instructions stored in the storage 306 to perform in the manner recited above. This kind of configuration, processor executing instructions stored in memory, can be used to implement any of the functions and devices described herein, and to perform any of the steps described herein.

The various embodiments and examples described above are, as stated, merely examples. Many variations may be implemented to suit a particular implementation, and the various features may be combined, divided, rearranged, omitted and/or augmented as desired. As one example, various components such as the modulator retasking components may reside in a modular circuit removably attached to a gateway that would otherwise only use the upstream transmitters for their original upstream intended purpose. The scope of this patent should not be limited by any of the specific examples described herein.

What is claimed is:
1. A method, comprising:
sending, to a device in a communication network, upstream signals from at least one upstream modulator in a gateway of a user premises;
receiving a request for content to be delivered to a device at the user premises;
retasking said at least one upstream modulator to switch a transmission frequency from an upstream frequency to a downstream frequency to transmit the content downstream to said device at the user premises; and
using a filter to change signal filtering at the gateway, in response to the retasking, wherein the filter is located on an upstream side of the at least one upstream modulator, and wherein the method further comprises:

setting the filter to block the downstream frequency prior to the retasking, and switching the filter to pass the downstream frequency after the retasking.

2. The method of claim 1, further comprising:

the gateway receiving the content using a first modulation type; and using a different second modulation type to transmit the content on the downstream frequency.

3. The method of claim 1, further comprising:

replacing a first downstream channel received from the device in the communication network with a second downstream channel generated by the gateway; and supplying a passthrough downstream frequency range having the second downstream channel to an on-premise communication network.

4. The method of claim 1, further comprising:

the gateway receiving the request for content from a wireless remote control using a whitespace RF interface.

5. The method of claim 1, further comprising:

the gateway storing modulation preference information for a one-way television coupled to the gateway via an on-premise communication network.

6. The method of claim 1, wherein the at least one upstream modulator uses a same antenna for making upstream and downstream transmissions.

7. A method, comprising:

sending, to a device in a communication network, upstream signals modulated at an upstream frequency from at least one upstream modulator in a gateway of a user premises;

retasking said at least one upstream modulator to transmit content downstream modulated at a downstream frequency to a device at the user premises, wherein the retasking further comprises retasking an upstream QAM transmitter to transmit at the downstream frequency; and using a filter, located on an upstream side of the at least one upstream modulator, to filter the downstream frequency to block the downstream frequency prior to the retasking of the at least one upstream modulator and to pass the downstream frequency after the retasking of the at least one upstream modulator.

8. The method of claim 7, wherein the retasking further comprises retasking the upstream QAM transmitter to transmit at a VHF or UHF frequency.

9. A non-transitory computer-readable medium, storing instructions that cause the following to occur upon execution:

sending, to a device in a communication network, upstream signals from at least one upstream modulator in a gateway of a user premises;

receiving a request for content to be delivered to a device at the user premises;

retasking said at least one upstream modulator to switch a transmission frequency from an upstream frequency to a downstream frequency to transmit the content to said device at the user premises; and using a filter to change signal filtering at the gateway, in response to the retasking, wherein the filter is located on an upstream side of the at least one of the upstream modulators, and wherein the instructions are further for causing the following to occur upon execution:

setting the filter to block a downstream frequency prior to the retasking, and switching the filter to pass the downstream frequency after the retasking.

10. The non-transitory computer-readable medium of claim 9, further storing instructions that cause the following to occur upon execution:

the gateway receiving the content using a first modulation type and using a different second modulation type to transmit the content on the downstream frequency.

11. The non-transitory computer-readable medium of claim 9, further storing instructions that cause the following to occur upon execution:

the gateway replacing a first downstream channel received from the device in the communication network with a second downstream channel generated by the gateway; and supplying a passthrough downstream frequency range having the second downstream channel to an on-premise communication network.

12. The non-transitory computer-readable medium of claim 9, further storing instructions that cause the following to occur upon execution:

the gateway storing modulation preference information for a one-way television coupled to the gateway via an on-premise communication network.

13. The non-transitory computer-readable medium of claim 9, wherein the retasking further comprises retasking an upstream QAM transmitter of a DOCSIS cable modem to transmit at a frequency outside of a DOCSIS upstream frequency range.

14. The non-transitory computer-readable medium of claim 9, wherein the retasking further comprises retasking an upstream QAM transmitter of a DOCSIS cable modem to transmit at a VHF or UHF frequency.

15. A device, comprising:

a plurality of upstream modulators configured to transmit signals to a first network, wherein at least one of the upstream modulators is a switchable modulator configured to switch from transmitting on an upstream frequency to the first network to transmitting on a downstream frequency to a second network; and a filter configured to block the downstream frequency while the switchable modulator is transmitting on the upstream frequency and to pass the downstream frequency when the switchable modulator is transmitting on the downstream frequency.

16. The device of claim 15, wherein the device is a coaxial cable modem configured to be coupled to the first network by at least a coaxial cable.

17. The device of claim 15, wherein the switchable modulator is configured to switch between QAM upstream operation and UHF or VHF downstream operation.

* * * * *